US006959943B2

(12) United States Patent
Steimke

(10) Patent No.: US 6,959,943 B2
(45) Date of Patent: Nov. 1, 2005

(54) DEFLECTABLE AIRBAG HOUSING MOUNTING TABS

(75) Inventor: Daniel L. Steimke, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 121 days.

(21) Appl. No.: 10/298,498

(22) Filed: Nov. 18, 2002

(65) Prior Publication Data

US 2004/0094937 A1 May 20, 2004

(51) Int. Cl.[7] ............................................. B60R 21/16
(52) U.S. Cl. ................................................... 280/728.2
(58) Field of Search .............................. 280/731, 728.2, 280/728.1

(56) References Cited

U.S. PATENT DOCUMENTS

| | | | | |
|---|---|---|---|---|
| 4,943,027 A | * | 7/1990 | Nakayama ................... 248/548 |
| 5,044,663 A | | 9/1991 | Seizert ......................... 280/730 |
| 5,314,203 A | | 5/1994 | Adams et al. ............... 280/728 |
| 5,403,981 A | | 4/1995 | Chen et al. ............... 200/61.54 |
| 5,426,831 A | | 6/1995 | Leonelli, Jr. .................. 24/459 |
| 5,580,082 A | * | 12/1996 | Shiga et al. .............. 280/728.3 |
| 5,829,777 A | * | 11/1998 | Sakurai et al. ........... 280/728.2 |
| 6,126,193 A | * | 10/2000 | Hosoi et al. ................. 280/731 |
| 6,149,184 A | * | 11/2000 | Ennis et al. .............. 280/728.2 |
| 6,302,432 B1 | | 10/2001 | Magoteaux et al. ...... 280/728.2 |
| 6,409,208 B1 | * | 6/2002 | Frisch et al. ............. 280/728.2 |
| 6,412,812 B1 | * | 7/2002 | Ford ........................... 280/731 |
| 6,419,261 B1 | * | 7/2002 | Ibe .......................... 280/728.2 |
| 2004/0017068 A1 | * | 1/2004 | Weis et al. .................. 280/731 |

* cited by examiner

Primary Examiner—Faye M. Fleming
(74) Attorney, Agent, or Firm—Sally J. Brown

(57) ABSTRACT

An airbag housing having elastically deflectable mounting tabs is disclosed. The mounting tabs allow for positionable attachment of an airbag module to a vehicle structural member. The mounting tabs may be defined by U-shaped slots in the airbag housing. The semi-flexible mounting tabs deflect during attachment of the airbag module to the steering wheel to provide good fit and finish between an associated decorative airbag cover and the steering wheel. The mounting tabs may also include attachment members to provide attachment location for coupling the airbag housing to the vehicle structural member.

33 Claims, 5 Drawing Sheets

DEFLECTABLE AIRBAG HOUSING MOUNTING TABS

BACKGROUND OF THE INVENTION

1. Field of the Invention

The present invention relates to airbag modules. More specifically, the present invention relates to a system of deflectable mounting tabs located on an airbag housing to provide good fit and finish between a decorative airbag cover and a vehicle steering wheel.

2. Description of Related Art

Throughout recent decades, airbags have proven to be an effective tool in preventing death and injuries caused by vehicle collisions. In order to provide increased protection for vehicle occupants, airbag modules are currently being employed in multiple locations within a vehicle. Often, airbag modules are placed in highly visible locations of the vehicle, such as the steering wheel or instrument panel. If a highly visible airbag module is not attached properly, the airbag module may have a poor appearance. Attachment problems can result in airbag modules having gaps at their perimeters or not having a flush alignment with adjacent components.

One cause of attachment problems within airbag modules is selecting an appropriate tolerance range for the airbag module components. Generally, airbag module components, as with most components, must balance between tight tolerances and low cost. Tight tolerances are desirable because the attachment fit and size of multiple components are controlled. Tight tolerances also prevent attachable parts from being too large or too small to properly couple corresponding parts. However, obtaining tight tolerances is often very expensive because of the machinery, tools, and materials needed to obtain such tolerances.

While tight tolerances are desirable, processes that are not capable of tight tolerances are commonly employed because of their low cost and short manufacturing time. Processes such as injection molding and metal stamping allow complex components to be manufactured with minimal time and material, resulting in a low cost component. Yet, these processes are not always capable of maintaining tight tolerances. While the inexpensive processes may not have tight tolerances, the tolerances are often within a range that does not cause any attachment or appearance problems.

However, if multiple components having loose tolerances are attached together, the loose tolerances of the individual components may combine to create a product that is out of the overall tolerance range of the part. For example, an airbag module may include an airbag housing made through a stamping process, an airbag cover, and airbag fasteners made by an injection molding processes. Typically, any one of these components may have an acceptable tolerance range. But when all three components are attached together, the overall airbag module may exceed acceptable tolerance ranges. This is known as tolerance stacking.

Tolerance stacking occurs when two or more components are attached to one another where both components are near the extreme allowable tolerances. For example, an airbag housing may have a height of 5 cm±0.2 cm and a airbag cover may have a height of 8 cm±0.3 cm. If both the airbag housing and the airbag cover are at their largest allowable tolerances, the assembled airbag module has a height of 13.5 cm. If both the airbag housing and the airbag cover are at the lowest allowable tolerances, the assembled airbag has a height of 12.5 cm. The difference between the largest and smallest assembled airbag modules is ±0.5 cm. Thus, the tolerances of two objects may have a tolerance range that is outside the allowable range of any one of the individual components.

In an airbag module, the airbag cover is generally attached to the airbag housing, creating the potential for tolerance stacking between the two components. Additionally, the airbag housing may be attached to a vehicle structural member through injection molded fasteners, possibly creating additional tolerance stacking. If all three of the components are at their high end of allowable tolerances, the airbag module may extend above adjacent components and may also have a gap around its perimeter. If all three components are at their low end of allowable tolerances, the airbag module may be recessed too far into the vehicle attachment structure.

Thus, the cost and fit of an airbag module are often weighed against each other. If the tolerances on the airbag module components are tight, the airbag module will have a proper fit, but the overall cost of the airbag module will be high. Alternatively, if the tolerances of the airbag module components are loose, the overall cost of the airbag module will be low, but may have a poor fit.

Therefore, what is needed in the art is an airbag module capable of a properly aligned fit within a vehicle. What is also needed in the art is an airbag module that may be manufactured using inexpensive processes. What is further needed is a system for inexpensively correcting the result of tolerance stacking in an airbag module. Such a system and apparatus is disclosed herein.

SUMMARY OF THE INVENTION

The apparatus of the present invention has been developed in response to the present state of the art, and in particular, in response to the problems and needs in the art that have not yet been fully solved by currently available airbag modules. Thus, it is an overall objective of the present invention to provide an airbag module that may inexpensively overcome tolerance stacking.

The present invention is comprised of an airbag housing having deflectable mounting tabs. The deflectable mounting tabs provide a mechanism for attaching the airbag module to a vehicle structural member, such as a steering wheel. As the airbag module is attached to a vehicle structural member, the deflectable mounting tabs elastically deform until the airbag is in flush alignment with the steering wheel or other vehicle structural member. Thus, the attachment of the airbag module overcomes any tolerance stacking to provide a good fit and finish with the steering wheel.

The mounting tabs may be comprised of U-shaped slots located in the base surface of the airbag module. The U-shaped slots may define mounting tabs that cantilever substantially in-plane from the base surface. The cantilevering configuration allows the mounting tabs to bend about the cantilevering location defined by the U-shaped slots. Additionally, the mounting tabs may be positioned within the perimeter of the airbag housing.

In order for the mounting tabs to couple to a vehicle structural member, the mounting tabs may include attachment members. The attachment member may be an aperture or protrusion configured to engage a corresponding attachment member in the vehicle structural member. Various fasteners, including slidably attaching snap-locking fasteners, may be employed to attach the airbag housing to the vehicle structural member via the mounting tabs.

An embossment may also be present at the location where the mounting tabs cantilevers from the base surface. The embossment may provide additional strength and control for bending the deflectable mounting tabs. Various shapes of embossment may also be employed, such as an S-shaped embossment.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

The present invention provides for an airbag module having a low cost system for correcting the negative effects of tolerance stacking in airbag module assembly applications. Tolerance stacking occurs when the actual measurement of various components are near their extreme end of allowable tolerance ranges, such that in an assembled configuration the component as a whole is outside an allowable tolerance range. In an airbag module, tolerance stacking can prevent a flush alignment of the airbag module to a steering wheel or other vehicle structural member, causing unsightly gaps around the perimeter of the airbag module.

In order to overcome the associated problems with tolerance stacking without tightening the tolerances of the airbag components, an airbag housing having deflectable mounting tabs is provided. The deflectable mounting tabs provide a mechanism for attaching the airbag module to a vehicle structural member, such as a steering wheel. If a gap is present between the airbag module and the vehicle structural member, the elastically deflectable mounting tabs are deformed until the airbag is in flush alignment with the steering wheel or other vehicle structural member.

Figure 1:
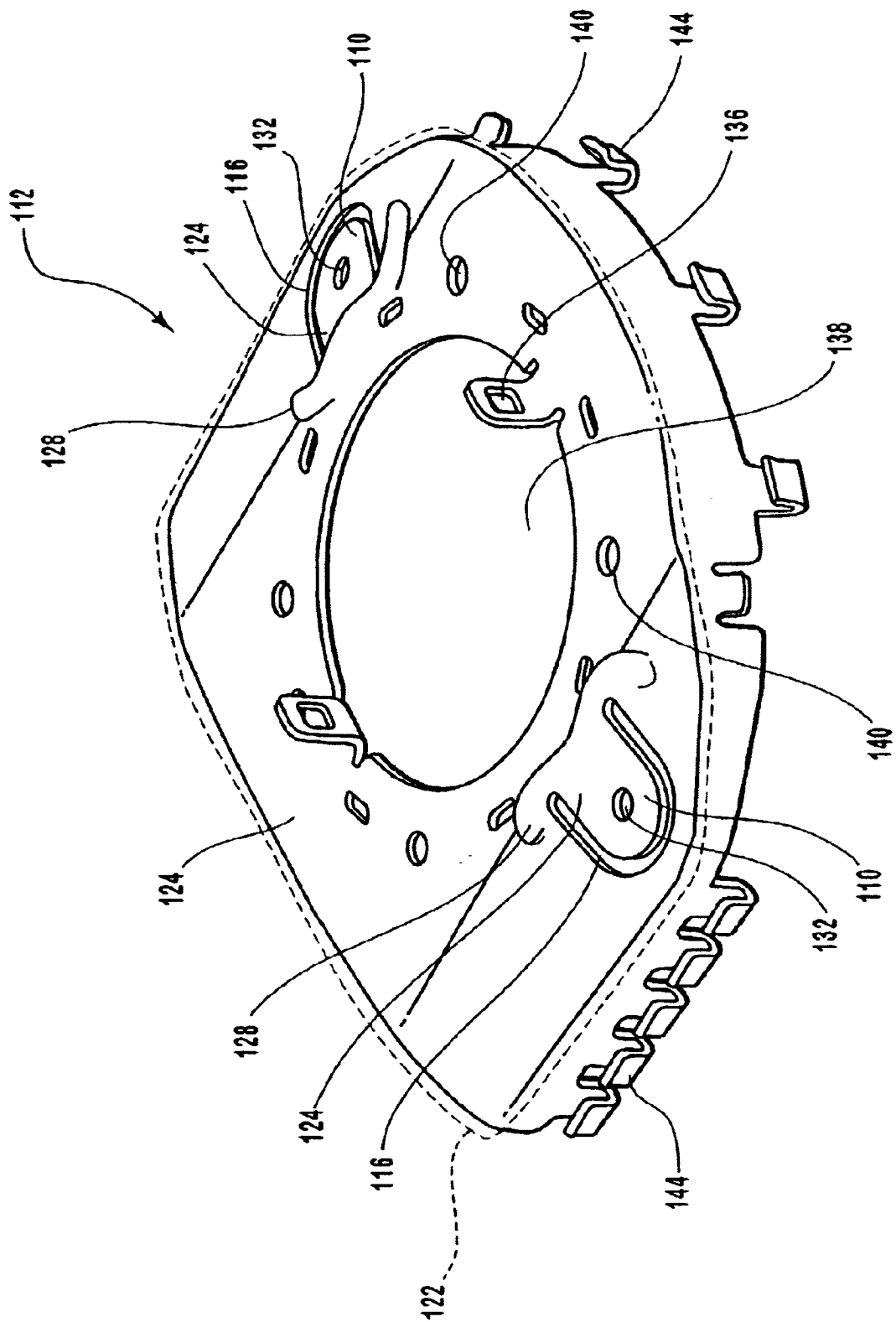
FIG. 1 is a perspective view of an airbag housing according to one embodiment of the invention.

Referring now to FIG. 1, a perspective view of an airbag housing 112 is illustrated. The airbag housing 112 is a generally rigid member configured to support various airbag module components. The airbag housing 112 may support an airbag, airbag cover, and inflator. The airbag housing 112 may also function as a base for attaching the airbag module to a vehicle structural member. By attaching the various airbag module components to the airbag housing 112, the airbag module may be assembled separately from the vehicle and then attached to the vehicle via the airbag housing 112.

The present airbag housing 112 incorporates plastically deflectable mounting tabs 110 to allow adjustment of the airbag module in the presence of tolerance stacking. The mounting tabs 110 are configured to define an adjustable mounting member to attach the airbag housing 112 to a vehicle structural member. In the embodiment illustrated in FIG. 1, the mounting tabs 110 are defined by U-shaped slots 116 stamped into the base surface 120 of the airbag housing 112. The base surface 120 may be defined as the generally broad face of the airbag housing 112.

The U-shape slots 116 allow the mounting tabs 110 to have a cantilevering configuration, where one end of the mounting tabs 110 is attached to the housing 112 and the other end of the mounting tabs 110 is free to deflect. The mounting tabs 110 may be located within the perimeter 122 of the airbag housing 112. Locating the mounting tabs 110 within the perimeter of the airbag housing 112 allows the mounting tabs 110 to be incorporated into the airbag housing 112 without the need to increase the outline size of the airbag housing 112. Furthermore, locating the mounting tabs 110 within the perimeter of the airbag housing 112 reduces the length of a moment arm created between the attached mounting tabs 110 and a thrust producing inflator. By reducing the moment arm length, the torsional force applied to the mounting tabs 110 can be reduced.

The mounting tabs 110 are configured to elastically deflect about the cantilevering location 124 when mounting fasteners (shown in FIG. 2), are tightened. The mounting tabs 110 return generally to their original positions after the mounting fasteners are removed for serviceability.

The degree of deflection will depend upon amount of tolerance stacking in the airbag module and the initial position of the mounting tabs 110. Because the mounting tabs 110 may be defined by U-shaped slots 116 in the base surface 120 of the airbag housing 112, the mounting tabs 110 may be generally in-plane with the base surface 120. Upon deflection of the mounting tabs 110, the mounting tabs 110 bend to an orientation that is at least partially out-of-plane with the base surface 120. However, in other embodiments the mounting tabs may be initially positioned out-of-plane with the base surface 120 and then deflect to an in-plane position. In yet another configuration, the mounting tabs 110 may be positioned out-of-plane in both the deflected and non-deflected positions.

The initial positioning and orientation of the mounting tabs 110 can be easily established when manufacturing the airbag housing 112 through a stamping process. Stamping is the process by which a generally flat plate can be manufactured into a complex, three-dimensional structure by cutting the plate and bending the cutout shapes of the plate into the desired orientation. Through stamping, the shape and orientations of the mounting tabs 110 may be established through changes in the tooling.

Stamping will create mounting tabs 110 that are integrally formed to the airbag housing 112. However, non-integrally formed mounting tabs 110 may also be employed in the airbag housing 112. A non-integrally formed mounting tab 110 would be a tab that is welded, adhered, or otherwise attached to the airbag housing 112. The non-integrally formed mounting tab 110 would be able to deflect about the location where the non-integrally formed mounting tab 110 is attached to the airbag housing 112.

The mounting tabs 110 may also have various shapes and positions other than those illustrated in FIG. 1. Generally, the mounting tabs 110 may be any shape that allows the mounting tabs 110 to be attached to a vehicle structural member and to deflect once attached. Furthermore, the position of the mounting tabs 110 may be located anywhere on the airbag housing 112. However, it is preferred that the position of the mounting tabs 110 not interfere with attachment of the inflator, airbag cover, or airbag.

The airbag housing 112 may include various numbers of mounting tabs 110. For example, the airbag housing 112 may only require one mounting tab 110 to attach the airbag housing 112 to the vehicle structural member. Alternatively, more than two mounting tabs 110 may be employed in an airbag housing 112. Additionally, when multiple mounting tabs 110 are employed, the individual mounting tabs 110 need not be identical. The mounting tabs 110 may be individually configured for individual applications and for any number of locations on the airbag housing. 112

The mounting tabs 110 may further include embossments 128 at the cantilevering locations 124. The embossments 128 are indentations present in the airbag housing 112 that are convex on one side of the airbag housing 112 and concave on the other. In the airbag housing illustrated in FIG. 1, the embossments 128 are stamped into the base surface 120 of the airbag housing 112, where the convex side is visible. The embossments 128 may have any number of shapes, such as an S-shape, or C-shape.

The embossments 128 are indentations present in the airbag housing 112, being convex on one side of the airbag housing 112 and concave on the other. In the airbag housing illustrated in FIG. 1, the embossments 128 are stamped into the base surface 120 of the airbag housing, where the convex side is visible. The embossments 128 may have any number of shapes, such as an S-shape, or C-shape.

The embossments 128 provide several functions for the mounting tabs 110. One function of the embossments 128 is to distribute the stresses created at the cantilevering locations 124 of the mounting tabs 110 when the mounting tabs 110 are deflected. The embossments 128 allow some of the bending of the airbag housing 112 material to occur in the raised sections of the embossments 128 and not entirely at the cantilevering locations 124. By distributing the bending across the embossments 128, the stresses at any one location may be lower than if only the cantilevering locations 124 of the mounting tabs 110 were bent.

Another function of the embossments 128 is to provide a desirable grain orientation in the metal at the cantilevering location 124 of the mounting tabs 110. When the embossments 128 are stamped into the airbag housing 112, some of the grains in the metal will orient to conform to the contours of the embossments 128. By reorienting the grains in the metal, the mounting tabs 110 are able to have a large deflection with a reduced possibility of tearing the housing.

The mounting tabs 110 may further include airbag module attachment members 132. The airbag module attachment members 132 are configured to provide a mechanism to attach the airbag module to the vehicle structural member. In the mounting tabs 110 illustrated in FIG. 1, the airbag module attachment members 132 are apertures. The apertures may receive corresponding fastener members of the vehicle structural member. The airbag module attachment members 132 may also incorporate protrusions in place of apertures, or other similar male-type fasteners. However, apertures may be generally preferred because they may be easily stamped into the mounting tabs 110 when the mounting tabs 110 are being formed.

Various other components may also be formed into the airbag housing 112 to facilitate attachments of other components to the airbag housing 112. The airbag housing may include brackets 136 that facilitate attachment of a cover (shown in FIG. 2) to the airbag housing 112. The brackets 136 may be stamped into the housing when the airbag housing 112 is formed. The brackets 136 illustrated in FIG. 1 are out-of-plane with the base surface 120 and positioned around the perimeter of the inflator opening 138 in the center of the airbag housing 112.

The airbag housing 112 may also include apertures 140 for receiving and mounting an inflator. The apertures 140 may be positioned around the inflator opening 138. The apertures 140 may be sized to receive fasteners to attach an inflator to the airbag housing 112.

The airbag housing 112 may also include airbag cover fasteners. In the embodiment illustrated in FIG. 1, the airbag cover fasteners are a plurality of hook fasteners 144 that attach to window fasteners in the airbag cover (shown in FIG. 2). The hook fasteners 144 are generally broad hooks that are stamped and integrally formed into the airbag housing 112. The hooks engage the edges of window openings in the airbag cover.

Figure 2:
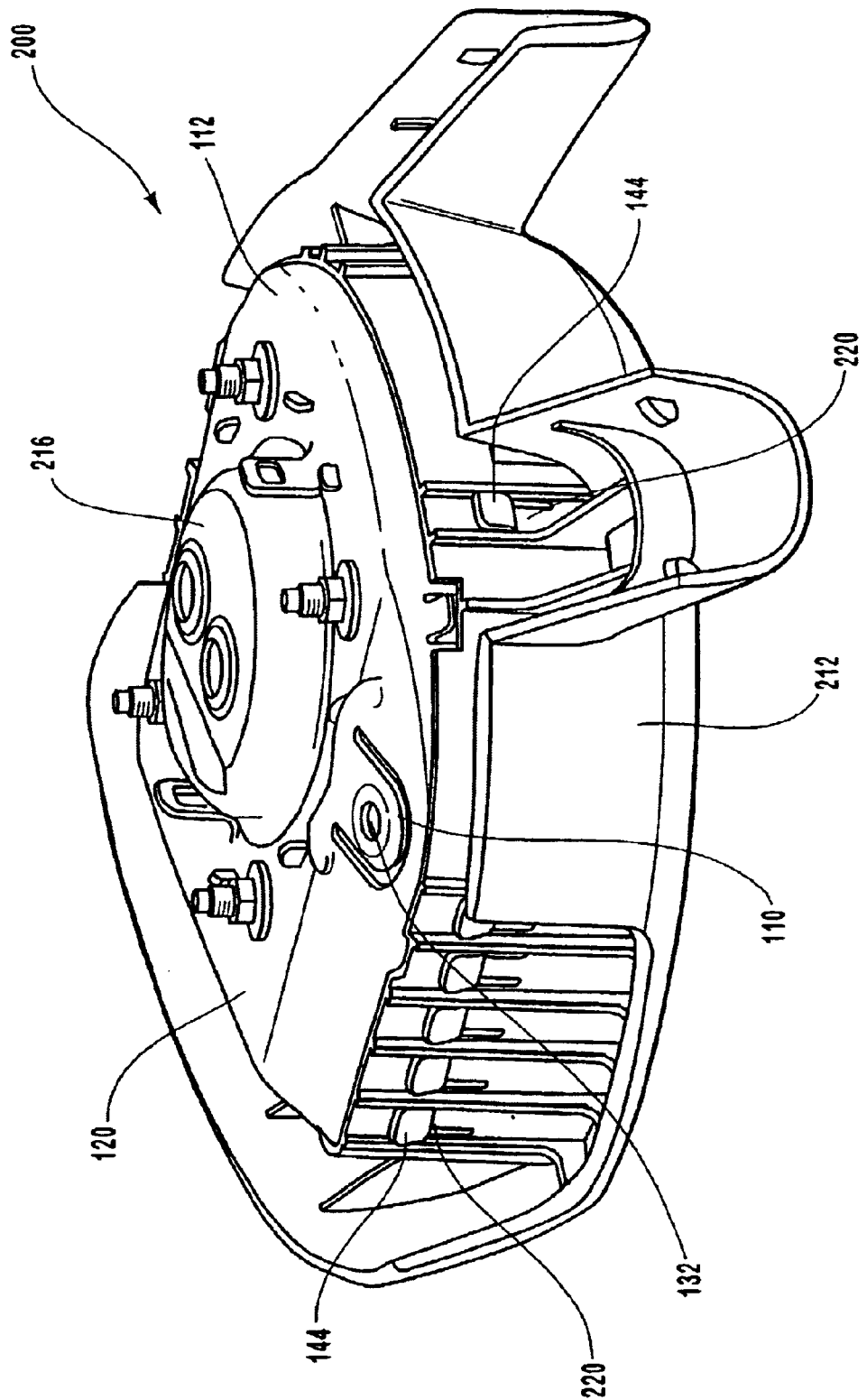
FIG. 2 is a perspective view of an airbag module according to one embodiment of the invention.

Referring now to FIG. 2, an assembled airbag module 200 is illustrated. The airbag module 200 has an airbag cover 212 and an inflator 216 attached to the airbag housing 112. The airbag cover 212 is attached to the airbag housing 112 through hook 144 and window 220 fasteners. The airbag cover 212 provides the aesthetic exterior of the airbag module 200 which is exposed to the interior the vehicle. The airbag cover 212 may be made of an injection molded plastic or other injection molded material.

Similar to the stamping process used in manufacturing the airbag housing 112, injection molding is a fast and cost-effective method for manufacturing a complex shape. However, both the stamping and injection molding processes have generally loose tolerances, such that the attachment of the stamped housing 112 to the molded cover 212 has the potential for significant tolerance stacking.

While the tolerance stacking created by the airbag housing 112 and the airbag cover 212 will affect the overall tolerance of the airbag module 200, the tolerances in the mechanisms that attach the airbag module 200 to a vehicle structural member will affect the allowable tolerance range between the airbag module and a vehicle structural member. The mounting tabs 110 should have a deflection range that is greater than the largest tolerance extremes in the airbag module 200 members. Also, the deflection of the mounting tabs 110 should be greater than the largest allowable tolerances in the attachment of the airbag module 200 to the vehicle structural member.

Figure 3:
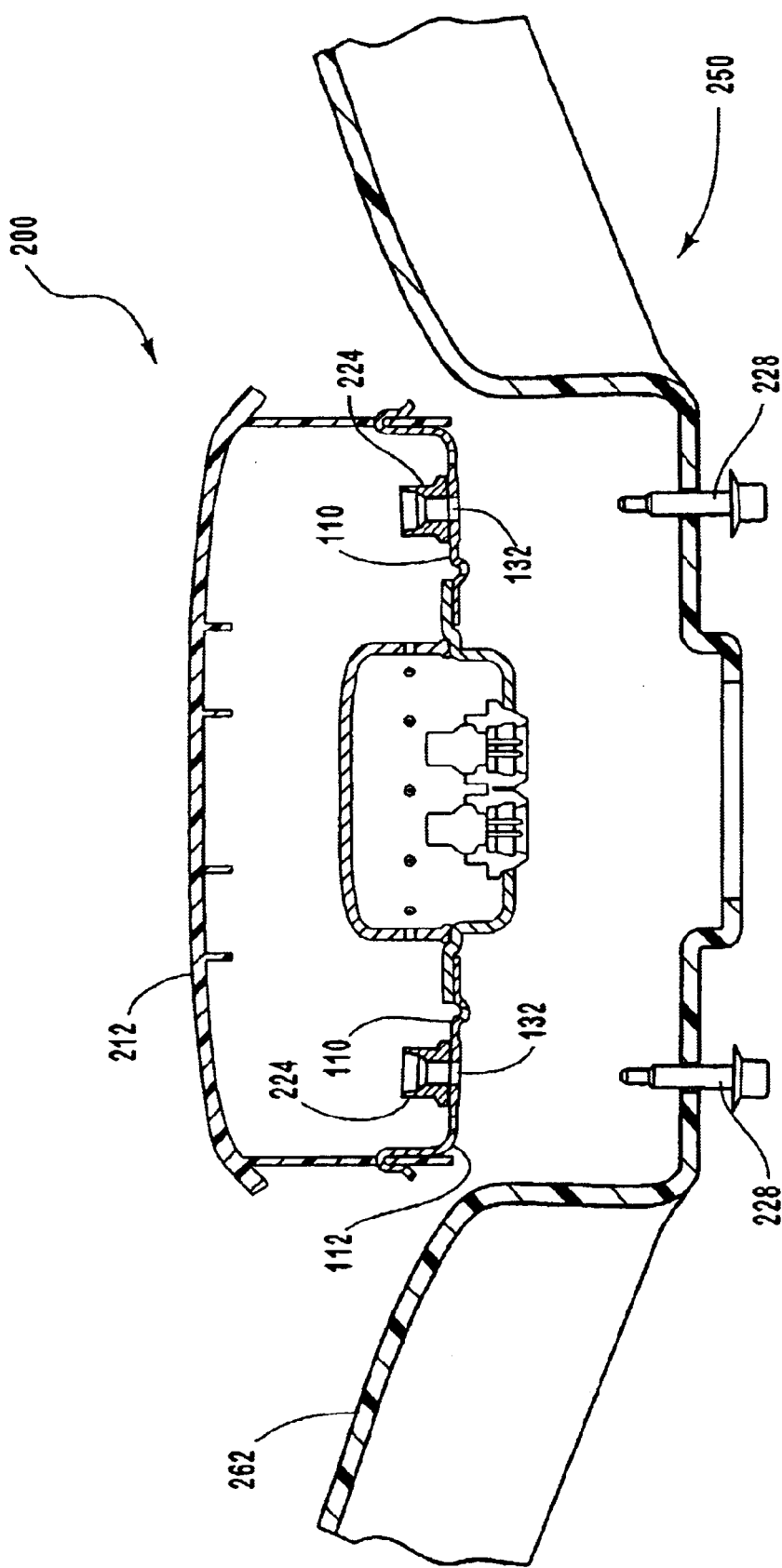
FIG. 3a is a cross-sectional view of an airbag module and a vehicle structural member in an unassembled configuration.

Referring now to FIG. 3, a cross-sectional view of an airbag module 200 and a steering wheel structure 250 is illustrated. The airbag module 200 and the steering wheel structure 250 incorporate airbag module mounting fasteners 224 and steering wheel mounting fasteners 228 to attach the airbag module 200 to the steering wheel structure 250.

Alternatively, the airbag module mounting fasteners 224 and the steering wheel mounting fasteners 228 may be employed in attaching the airbag module 200 to the steering wheel structure 250. A threaded nut may be pressed into the mounting tabs 110, where the threaded nut is configured to receive a threaded nut or screw. The fastener 228 may be accessed from behind the steering wheel structure 250 to attach the airbag module 200. In alternative embodiments, different fastening schemes may be used within the scope of the present invention.

The airbag module mounting fasteners 224 are attached to the airbag housing 112 on the mounting tabs 110. The airbag module mounting fasteners 224 may be coupled to the attachment members 132 of the mounting tabs 110. For example, the airbag module mounting fasteners 224 may have a snap-locking end which locks in to the attachment member 132 aperture. Such snap-locking mechanisms allow the airbag module mounting fasteners 224 to be easily and quickly attached to the mounting tabs 110.

Similarly the steering wheel structure 250 may incorporate snap-locking steering wheel mounting fasteners 228 configured to attach to the airbag module mounting fasteners 224. The steering wheel mounting fasteners 228 receive and lock to the airbag module mounting fasteners 224. The steering wheel mounting fasteners 228 may extend from the steering wheel structure 250, such that the airbag module 200 may be slidably attached to the steering wheel structure 250.

Figure 4:
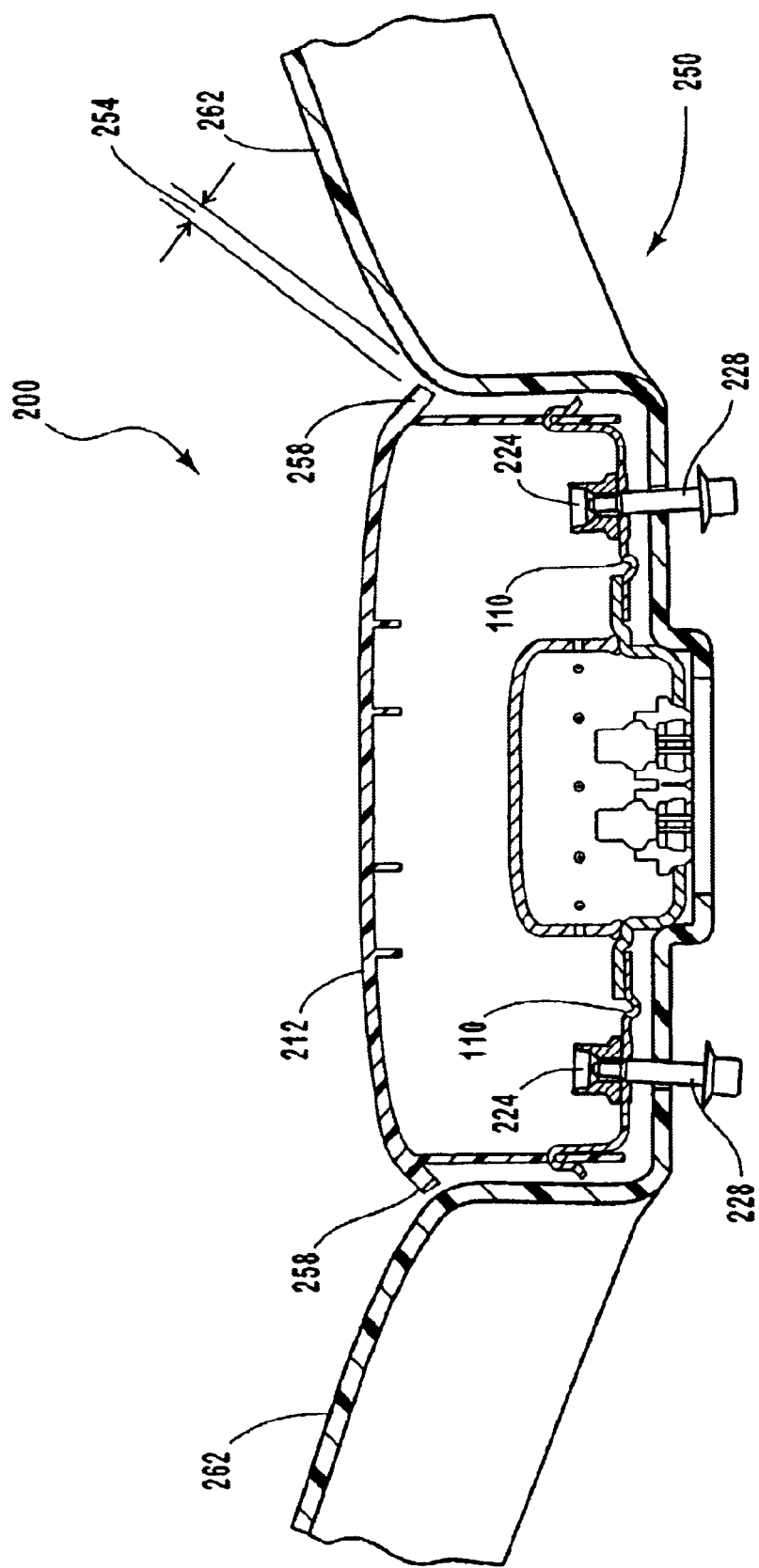
FIG. 4 is a cross-sectional view of the airbag module of FIG. 3 attached to a vehicle structural member in an undeflected configuration.

Referring now to FIG. 4, once the steering wheel fasteners 228 and the airbag module mounting fasteners 224 are aligned, the female-type mounting fasteners 224 and male-type mounting fasteners 228 are attached but not yet torqued. A gap 254 may be present between the airbag cover 212 and the steering wheel structure 250. The gap 254 may be caused by the edge 258 of the airbag cover 212 not touching the front 262 of the steering wheel structure 250. The gap 254 may be present around the entire perimeter of the airbag module 200, creating a non-aesthetic appearance. The gap 254 may be particularly noticeable on a steering wheel mounted airbag, where the vehicle occupant is looking directly at the airbag cover 212.

Figure 5:
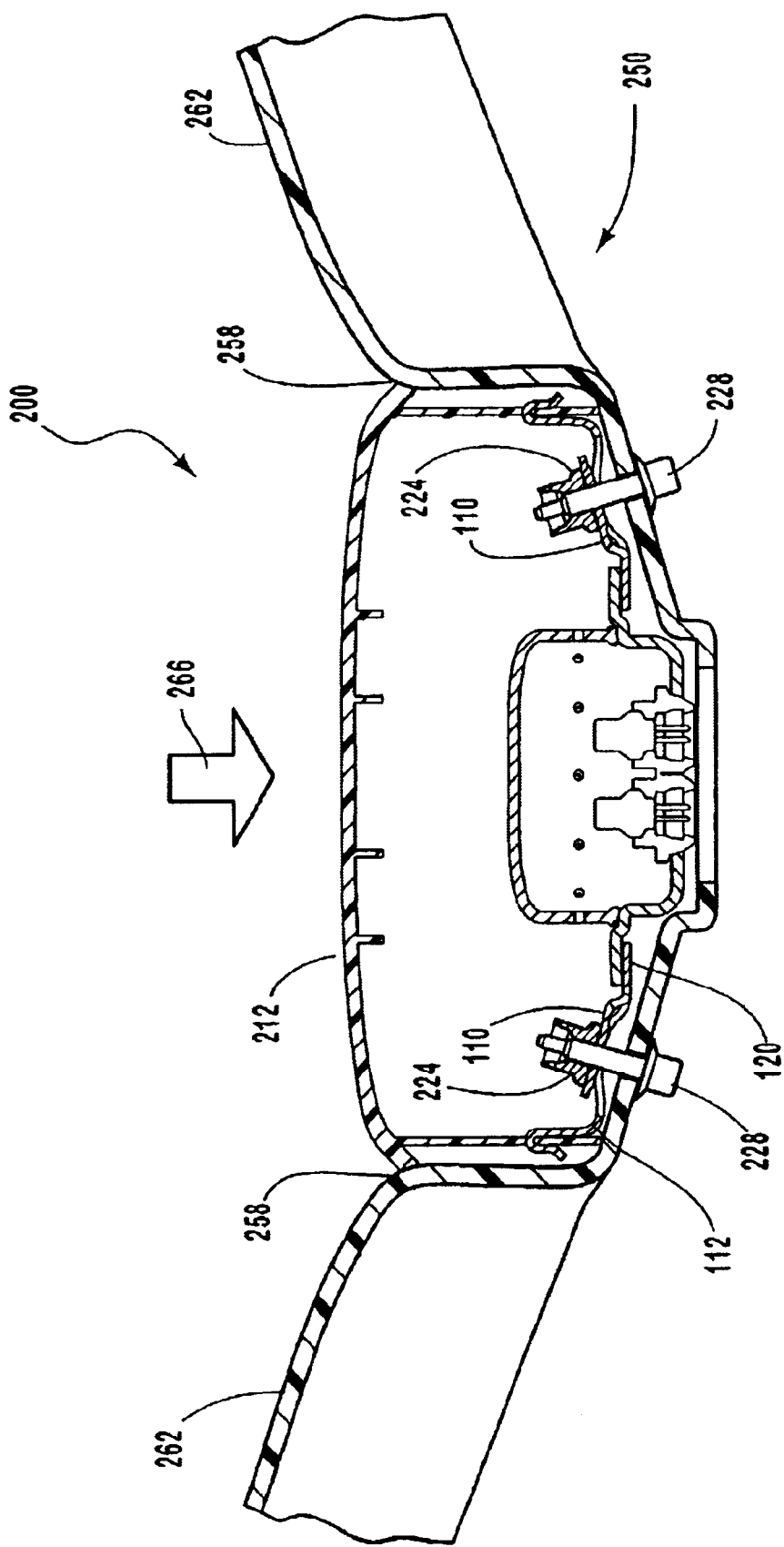
FIG. 5 is a cross-sectional view of an airbag module of FIG. 3 and a vehicle structural member in an assembled and deflected configuration.

Through the use of the deflectable mounting tabs 110, the gap 254 may be closed such that the edge 258 of the airbag cover 212 touches the front 262 of the steering wheel structure 250. Referring now to FIG. 5, the mounting fasteners 228 are tightened to a torque sufficient to deflect the mounting tabs 110. As the mounting tabs 110 deflect, the airbag module 200 moves into flush alignment with the steering wheel structure 250. Thus, the gap 254 created by excessive tolerance stacking may be inexpensively sealed by plastically deflecting the mounting tabs 110.

FIGS. 3–5 have illustrated an airbag module 200 attached to a steering wheel structure 250. However, the deflectable mounting tabs 110 may be employed in airbag modules 200 that are positioned throughout various locations of the vehicle, such as the instrument panel.

Generally, the present invention provides a cost-effective system for correcting tolerance stacking within airbag modules. The airbag housing employs elastically deflectable mounting tabs that deform while the airbag module is attached to a vehicle structural member to bring the airbag module into a flush alignment with the vehicle structural member.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag module member comprising:
   an airbag housing for attaching an airbag module to a vehicle, wherein the housing has a perimeter; and
   at least one deflectable mounting tab positioned within the perimeter of the housing, wherein the at least one deflectable mounting tab is defined by a U-shaped slot in the housing the at least one mounting tab having an airbag module attachment member, wherein the at least one tab is deflectable to allow a selective alignment between the housing and a vehicle structural member.

2. The airbag module member, as recited in claim 1, wherein the airbag attachment member is an aperture.

3. The airbag module member, as recited in claim 1, wherein the airbag attachment member is a protrusion.

4. The airbag module member, as recited in claim 1, wherein the airbag housing is slidably attachable to the vehicle structural member.

5. The airbag module member, as recited in claim 1, wherein the vehicle structure is a steering wheel.

6. The airbag module member, as recited in claim 1, further comprising an embossment positioned at a location wherein the at least one mounting tab is attached to the airbag housing.

7. The airbag module member, as recited in claim 6, wherein the embossment is generally S-shaped.

8. The airbag module member, as recited in claim 6, wherein the embossment is generally C-shaped.

9. The airbag module member, as recited in claim 1, further comprising a plurality of hook fasteners attachable to a plurality of window fasteners in an airbag cover.

10. The airbag module member, as recited in claim 1, wherein the at least one mounting tab is a separate member from the airbag housing, wherein the at least one mounting tab is attached to the airbag housing.

11. The airbag module member, as recited in claim 1, wherein the airbag housing is a stamped metal plate.

12. An airbag module member comprising:
   an airbag housing having a base surface, wherein the airbag housing is attachable to an airbag cover; and
   at least one mounting tab defined by a slot in the housing such that the mounting tab cantilevers substantially in-plane from the base surface, the mounting tab having an attachment member, wherein the at least one tab is deflectable to allow a selective alignment between the housing and the vehicle structural members.

13. The airbag module member, as recited in claim 12, wherein the housing has a perimeter.

14. The airbag module member, as recited in claim 13, wherein the at least one mounting tab is positioned within the perimeter of the airbag housing.

15. The airbag module member, as recited in claim 12, wherein the airbag attachment member is an aperture.

16. The airbag housing, as recited in claim 12, wherein the airbag attachment member is a protrusion.

17. The airbag module member, as recited in claim 12, further comprising an embossment cantilevering location of the at least one mounting tab attached to the airbag housing.

18. The airbag module member, as recited in claim 17, wherein the embossment is generally S-shaped.

19. The airbag module member, as recited in claim 17, wherein the embossment is generally C-shaped.

20. The airbag module member, as recited in claim 12, wherein the at least one mounting tab is defined by a generally U-shaped slot in the airbag housing.

21. The airbag module member, as recited in claim 12, further comprising a plurality of hook fasteners attachable to a plurality of window fasteners in an airbag cover.

22. The airbag module member, as recited in claim 12, wherein the at least one mounting tab is a separate member from the airbag housing, wherein the at least one mounting tab is attached to the base surface.

23. The airbag module member, as recited in claim 12, wherein the airbag housing is a stamped metal plate.

24. The airbag module member, as recited in claim 12, wherein the airbag housing is slidably attachable to the vehicle structural member.

25. An airbag module member comprising:

an airbag cover; and an airbag housing attachable to the airbag cover, the airbag housing having a base surface, wherein a plurality of mounting tabs are present in the base surface, the mounting tabs having attachment members, the mounting tabs further comprising an embossment cantilevering location, and wherein the mounting tabs cantilever substantially in-plane from the base surface, such that the tabs are deflectable to allow the airbag cover to be selectively aligned to a steering wheel member.

26. The airbag module member, as recited in claim 25, wherein the airbag attachment members are apertures.

27. The airbag module member, as recited in claim 25, wherein the airbag attachment members are protrusions.

28. The airbag module member, as recited in claim 25, wherein the embossment is S-shaped.

29. The airbag module member, as recited in claim 26, wherein the mounting tabs are defined by U-shaped slots in the airbag housing.

30. The airbag module member, as recited in claim 25, wherein the housing further comprises a plurality of hook fasteners attachable to a plurality of window fasteners in the airbag cover.

31. The airbag module member, as recited in claim 25, wherein the mounting tabs are separate members from the airbag housing, wherein the mounting tabs are attached to the base surface.

32. The airbag module member, as recited in claim 25, wherein the airbag housing is a stamped metal plate.

33. The airbag module member, as recited in claim 25, wherein the airbag housing is slidably attachable to the vehicle structural member.

* * * * *